O. D. BOWLES.
UNIVERSAL TRACTOR.
APPLICATION FILED JAN. 19, 1912.
1,227,576.
Patented May 29, 1917.
2 SHEETS—SHEET 2.
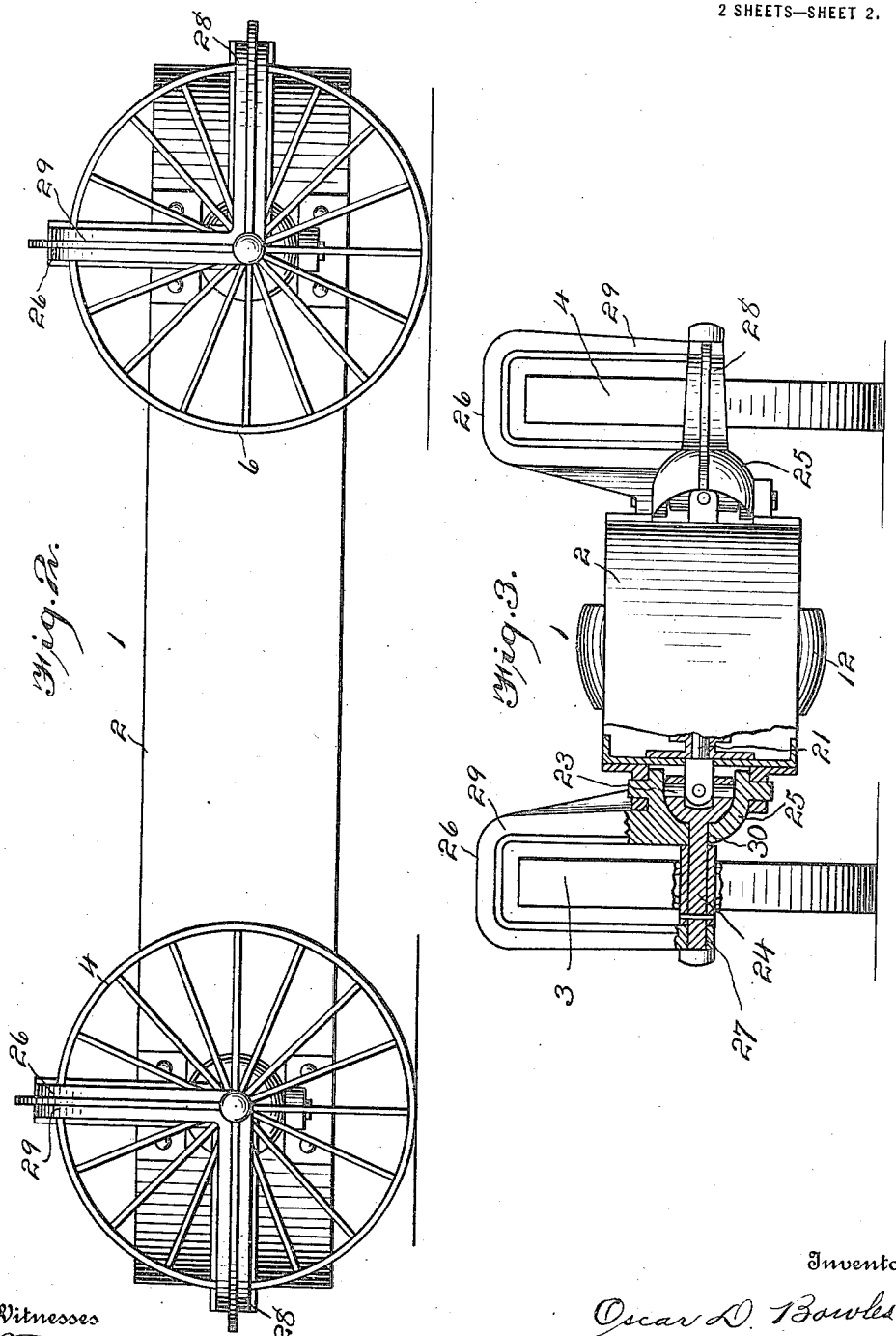
Witnesses
J. P. Brett
E. C. Duggy
Inventor
Oscar D. Bowles
By
Attorney

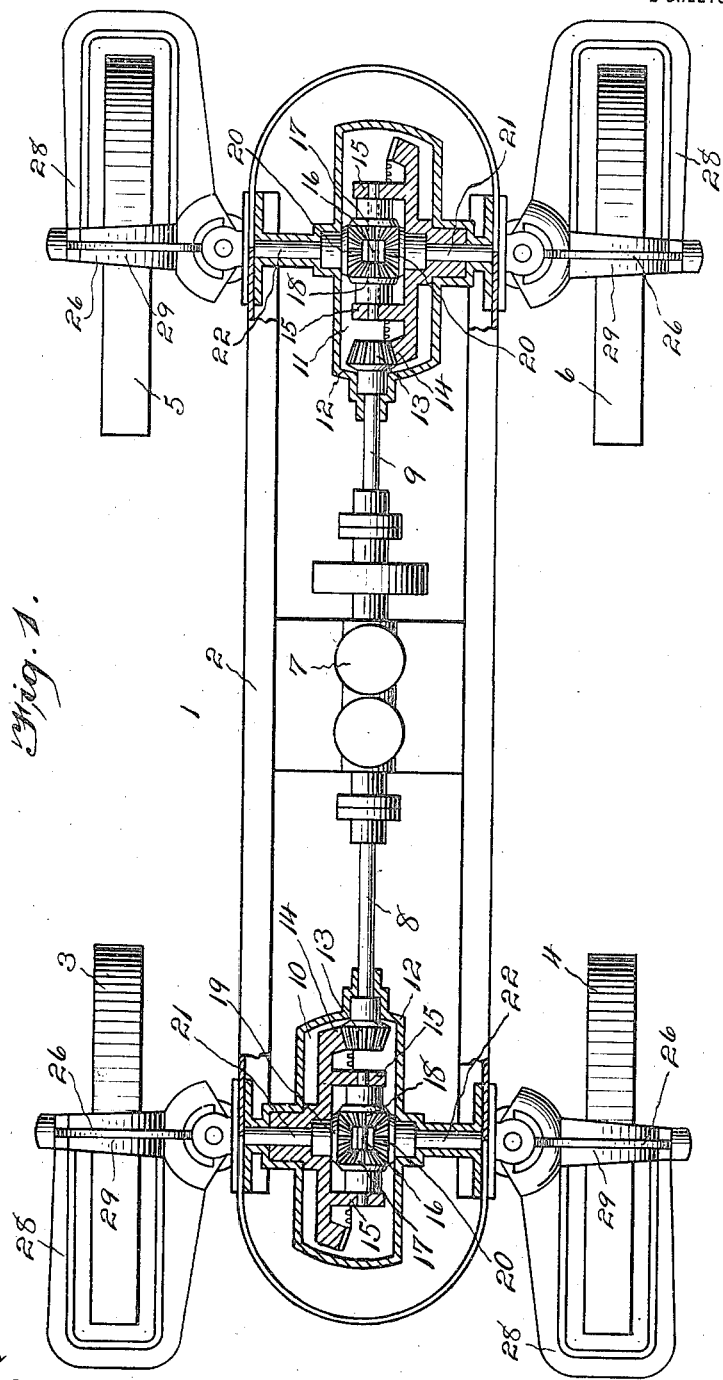

UNITED STATES PATENT OFFICE.

OSCAR D. BOWLES, OF TERRE HAUTE, INDIANA.

UNIVERSAL TRACTOR.

1,227,576.  Specification of Letters Patent.  Patented May 29, 1917.

Application filed January 19, 1912. Serial No. 672,099.

*To all whom it may concern:*

Be it known that I, OSCAR D. BOWLES, a citizen of the United States, residing at Terre Haute, in the county of Vigo and State of Indiana, have invented certain new and useful Improvements in Universal Tractors; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to a universal tractor and has for its object to provide a device of this kind upon which power is supplied to all four of the wheels of the tractor.

A further object of the invention is to provide a very simple and efficient construction for applying the power to the wheels and which will allow all the wheels to be driven when the same are at an angle to the body of the tractor, as when in position for turning or for steering the machine.

With this object in view the invention consists in the novel construction of the means for applying power to all four of the wheels simultaneously and in the universal joints which allow all the wheels to be driven while in the position of turning the machine or steering the same.

The invention also consists in certain other novel details of construction and in combinations of parts, all of which will be first fully described and afterward specifically pointed out in the appended claims.

Referring to the accompanying drawings:

Figure 1 is a plan view of a universal tractor constructed in accordance with this invention.

Fig. 2 is a side elevation of the machine, and

Fig. 3 is an end elevation partly in section illustrating the construction of the universal joint.

Like numerals of reference indicate the same parts throughout the several figures in which;

1 indicates the machine which comprises the body 2, wheels 3, 4, 5 and 6.

7 indicates a motor and 8 and 9 are the driving shafts extending longitudinally of the machine and driven by the motor 7.

At each end of the machine is arranged a differential gear 10 and 11 which is housed within a suitable casing 12. Upon the outer end of each of the driving shafts 8 and 9 is arranged a beveled gear 13, which beveled gear meshes with a larger beveled gear 14 facing at right angles to the axis of the former. Extending from the inner face of the beveled gear 14 are two studs or webs 15 in which is mounted a shaft 16. Carried on said shaft 16 are two beveled gears 17 and 18, which beveled gears are freely rotatable on the said shaft and mesh with similar beveled gears 19 and 20 secured on the transverse driven shafts 21 and 22.

23 indicates a universal joint which is connected to the driven shafts 21 and 22 as will appear from Fig. 3, the axles 24 of the wheels being also connected to the universal joints in such manner that said axles rotate with the said universal joint, the wheels of the tractor being rigidly secured to the axles 24 so as to rotate therewith.

The outer members 25 of the housing of the joints 23 are formed to provide carriers 26, which carriers extend upwardly and around the wheels and are provided with openings 27 to receive the outer ends of the axles 24. Additional arms 28 of the carriers formed upon the outer members 25 of, and at right angles to the joint housing, extend horizontally and around the wheels joining the arms 29 of the carrier 26. The preferable construction is to form the outer member 25 housing the universal joint 23 integral with both arms 28 and 29 of the carrier 26, which construction is extremely strong and rigid and is not liable to derangement or breakage. It will also be seen that the outer members 25 housing the universal joints 23 are provided with openings 30 through which the axles 24 pass and in which said axles are journaled.

It will be at once apparent from the accompanying drawings that the construction of the differential gear as just described is duplicated at each end of the machine, while a universal joint as described is provided for each wheel of the machine.

Having thus fully described the invention it is of course apparent that certain changes can be made in the form and construction of the parts shown and described and I consider myself clearly entitled to all such changes and modifications as fall within the scope of the appended claims.

What I claim as new and desire to secure by Letters Patent of the United States is:—

1. A device of the character described, including wheel axles, carriers for said wheel axles, each carrier comprising dual U-shaped members, one of which members is disposed vertically and the other horizontally with relation to the said axles in such manner as to provide wheel guards in the direction of movement of the device, each wheel axle carrier being provided with a socket forming extension, which extensions are provided with pivoting studs for pivotally supporting the said wheel axle carriers, motor driven shafts, universal joints between said wheel axles and said shafts, the outer member of each of said universal joints being provided with a semispherical enlargement to be received in one of said socket forming extensions, the whole arranged in such manner that the said socket forming extensions provide bearings for the said outer members of the universal joints and further prevent outward endwise movement of said outer members of said universal joints substantially as described and for the purposes set forth.

2. A device of the character described, including wheel axle carriers, each carrier being provided with a socket forming extension, said extensions being provided with pivoting studs for pivotally supporting the said carriers, motor driven shafts, wheel axles, the inner end of each wheel axle being provided with an enlargement and forming one member of a universal joint, the other member of the universal joint being formed on the outer end of each motor driven shaft, the said enlargement of each of the said axles forming the outer member of each universal joint being closely received in the said socket forming extension to provide a bearing therefor and to prevent outward endwise movement of the wheel axle and its universal joint member formed thereon.

In testimony whereof I affix my signature in presence of two witnesses.

OSCAR D. BOWLES.

Witnesses:
S. K. DUVALL,
MAY M. PADDOCK,